United States Patent
Zhdanok et al.

(10) Patent No.: US 6,884,368 B2
(45) Date of Patent: Apr. 26, 2005

(54) PROCESS FOR THE PRODUCTION OF A MIXTURE COMPRISING HYDROGEN AND CO

(75) Inventors: Serguei Zhdanok, Minsk (BY); Philippe Labrune, Saint-Maur (FR)

(73) Assignee: L'Air Liquide Sociétéanonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 289 days.

(21) Appl. No.: 09/833,639

(22) Filed: Apr. 13, 2001

(65) Prior Publication Data

US 2001/0033819 A1 Oct. 25, 2001

(30) Foreign Application Priority Data

Apr. 13, 2000 (FR) .............................................. 00 04766

(51) Int. Cl.[7] .............................. C01B 3/24; C01B 3/26
(52) U.S. Cl. ......................... 252/373; 423/650; 423/651
(58) Field of Search ................................ 423/650, 651, 423/652, 653, 654, 648.1; 252/373

(56) References Cited

U.S. PATENT DOCUMENTS

| | | | | |
|---|---|---|---|---|
| 2,443,423 | A | * | 6/1948 | Helmers |
| 3,228,892 | A | * | 1/1966 | Cole et al. |
| 4,869,730 | A | | 9/1989 | Bhatnagar et al. |
| 5,441,581 | A | | 8/1995 | Van den Sype et al. |
| 6,264,856 | B1 | * | 7/2001 | Autenrieth et al. ......... 423/651 |
| 6,488,838 | B1 | * | 12/2002 | Tonkovich et al. ...... 423/648.1 |
| 6,517,805 | B1 | * | 2/2003 | Schuessler et al. ...... 423/648.1 |
| 6,524,550 | B1 | * | 2/2003 | Chintawar et al. .......... 423/652 |
| 6,540,975 | B2 | * | 4/2003 | Tonkovich et al. ......... 423/659 |
| 6,616,909 | B1 | * | 9/2003 | Tonkovich et al. ...... 423/648.1 |
| 6,680,044 | B1 | * | 1/2004 | Tonkovich et al. ......... 423/652 |
| 2002/0013227 | A1 | * | 1/2002 | Dindi et al. |
| 2002/0127177 | A1 | * | 9/2002 | Gottzmann et al. |
| 2002/0155061 | A1 | * | 10/2002 | Prasad et al. |

FOREIGN PATENT DOCUMENTS

| | | |
|---|---|---|
| EP | 0 459 872 A1 | 10/1991 |
| GB | 1 598 825 A1 | 9/1981 |
| WO | WO 90/03218 A1 | 4/1990 |
| WO | WO 93/21350 A1 | 10/1993 |

* cited by examiner

Primary Examiner—Wayne A. Langel
(74) Attorney, Agent, or Firm—Burns, Doane, Swecker & Mathis, L.L.P.

(57) ABSTRACT

The invention relates to a process for production of a mixture comprising hydrogen and CO by partial oxidation of a hydrocarbon by an oxygenated medium, according to which the processing is carried out under autothermal conditions with the heat given off by said oxidation being recovered to maintain the endo-thermic reactions which take place between the non-oxidized fraction of said hydrocarbon and the $CO_2$ and the steam produced by said oxidation, being characterized in that the reaction gas mixture comprising the hydrocarbon and the oxygenated medium is passed through a porous medium (4) which has been preheated beforehand, thus making it possible to heat the reaction gas mixture by heat exchange with the porous medium to a temperature threshold sufficient to initiate combustion reactions, rendering unnecessary an external heat supply when operating continuously.

17 Claims, 2 Drawing Sheets

PROCESS FOR THE PRODUCTION OF A MIXTURE COMPRISING HYDROGEN AND CO

BACKGROUND OF THE INVENTION

1. Field of the Invention

The invention relates to the field of the production of mixtures comprising hydrogen and carbon monoxide by partial oxidation of light hydrocarbons, such as methane.

2. Description of the Related Art

Hydrogen is a gas which is widely used in chemistry. 500 million m³ of it are produced annually. Approximately 95% of this hydrogen is captive production used in refining, in petrochemicals, in the synthesis of methanol and for the production of ammonia.

Merchant hydrogen only represents a small fraction of this overall production and, for applications other than petrochemicals and fertilizers, it requires a greater or lesser state of purity.

In view of the increasing requirements for merchant hydrogen (a growth of approximately +10% per year is observed) and the future requirements anticipated in industry in general (chemicals, petro-chemicals, metallurgy, electronics, fine chemicals), in decentralized energy production and in clean and nonpolluting transportation means using fuel cells, and in view of the problems raised by the infrastructure for the distribution of hydrogen (transportation, storage, safety), it appears increasingly necessary to have available sources of hydrogen which can produce relatively low amounts of hydrogen in situ under conditions which are satisfactory from the viewpoint of profitability.

The bulk production of captive hydrogen is carried out by refiners and major chemical manufacturers by different methods.

The first of these methods is the steam reforming of hydrocarbons originating from oil or natural gas. This is a highly endothermic reaction carried out between 800 and 900° C. over a catalyst and under a pressure of approximately 15 atmospheres. The burners are situated outside the catalytic beds and the hydrocarbon/steam mixture is preheated by virtue of a heat exchanger which uses combustion gases. This process makes it possible to achieve $H_2/CO$ ratios of 3 to 5, according to the steam throughput.

The second of these methods is mixed reforming. This is a process which operates under autothermal conditions, where the thermal energy necessary for the steam reforming over a catalyst is contributed by the partial combustion of the methane to $CO_2$. The $H_2/CO$ ratio of the gases produced here is lower: typically between 1.5 and 2.5.

The third of these methods is the partial oxidation of the same hydrocarbons. This process does not require a catalyst. Combustion is carried out at 1 300–1 400° C. without steam. This process is exothermic but produces less hydrogen than the preceding processes.

It should be noted that the steam reforming reactions mentioned above require catalysts, which are sensitive to the impurities present in hydrocarbons originating from oil or contained in natural gas. It is therefore necessary, prior to the reactions described, to carry out an exhaustive desulfurization of the hydrocarbons. In contrast, the partial oxidation also mentioned above makes it possible to use dirtier hydrocarbons but this process has the disadvantage of generating soot.

Once the $H_2/CO$ mixture has been produced according to one of the preceding methods, the reaction for the production of hydrogen by conversion of the CO in the presence of steam over a catalyst, according to the reaction:

$$CO+H_2O \rightarrow CO_2+H_2 \tag{1}$$

can be promoted.

When it is desired above all to produce hydrogen, steam reforming seems to be the most advantageous process. In combination with the water gas reaction and with a process for the separation of the various gases produced, for example by Pressure Swing Adsorption (PSA), it makes it possible to obtain hydrogen of very good purity (comprising less than a few tens of ppm of impurity). The energy consumption, per kg of hydrogen produced, is approximately 40 kWh/kg, which represents an energy efficiency of approximately 83%.

Merchant hydrogen currently originates essentially from the following processes:

(a) the recovery of the hydrogen produced in chemical and refining dehydrogenation operations involving catalytic reforming or cracking;

(b) the diversion of a portion of the hydrogen produced by captive producers when it is in excess;

(c) the production of coke intended for the iron and steel industry;

(d) the electrolysis of sodium chloride solutions, where hydrogen is coproduced at the same time as chlorine.

Furthermore, small production units have been constructed which resort to the decomposition of hydrogen-rich molecules:

by thermal cracking of ammonia, by catalytic reforming of methanol, by electrolytic dissociation of water.

The latter processes result in hydrogen with a high cost price because of the cost of the starting materials (in particular methanol) or of the energy consumption (5 kWh per m³ of hydrogen produced for electrolysis). The thermal cracking of ammonia is a process which does not consume very much energy but the use of ammonia makes it a solution which is not very advantageous from the environmental viewpoint.

An advantageous alternative is to use catalytic generators of $H_2/CO$ atmospheres for heat treatments (for example, for carrying out cementation treatments of metal components), to add a water gas reactor at the outlet to convert the CO to $CO_2$ and hydrogen, and to separate the $CO_2$, the nitrogen possibly present and the hydrogen by methods known for this purpose.

There exists an extensive literature describing this type of process. The basic idea is to carry out a partial oxidation of a mixture comprising a hydrocarbon and an oxidizing gas over a catalyst generally based on a noble metal, such as platinum, nickel, rhodium or palladium. In these processes, it is necessary to add additional heating by burners or by an electrical element in order to achieve a temperature level sufficient for the reforming reactions, which are endothermic, to be able to be initiated. Part of this literature describes processes having the aim of improving and of controlling the temperature gradient in such reactors.

Thus, document GB-A-1 598 825 discloses an endothermic gas generator for the production of an $H_2/CO$ mixture intended for heat treatment. It preferably uses pure oxygen in order to avoid the external heat supply necessary for good progression of the reaction (which the presence of nitrogen would render necessary).

Document EP-A-450 872 shows a reactor in which an endothermic reaction, such as the production of an $H_2/CO$ mixture by reforming of methane by water, is carried out. A burner is placed at the center of the reactor, which makes possible more efficient heating of the catalytic bed in which the reaction takes place.

The same principle is improved in document WO-A-90/03 218, by virtue of circulation of the combustion gases around the catalytic bed, which makes it possible to limit the radial and axial temperature gradients.

Document U.S. Pat. No. 4,869,730 shows a U-shaped reactor in which an endothermic gas reaction takes place which makes possible the formation of a $CO/H_2/N_2$ mixture. The reactor is heated externally by burners.

Provision has also been made to carry out the production of a hydrogen/CO mixture in an externally heated annular reactor. This reactor has a cylindrical general shape and comprises, in its central part, a cylinder sealed off at least at its lower end which can either be empty or filled with an inert material or equipped with a heating means, such as an electrical element or a burner. The annular space of the reactor is filled with a catalytic medium. In comparison with a cylindrical reactor filled over its entire cross section with the catalytic medium, the annular reactor exhibits the advantage of decreasing the thermal gradients within the catalytic medium. The thickness of the catalytic medium is reduced and the transmission of the heat contributed by the external heating means is thus carried out more favorably therein. The optional presence of a burner or of other heating means in the central part of the annular reactor is also favorable from this viewpoint.

Each of the processes described above has disadvantages which make it difficult to apply them to small- or medium-sized plants for typically producing less than 1 000 m³/h of hydrogen. The capital cost required by steam reforming processes is crippling for small plants. The electrolysis of water is a process which is simple to operate and which is more suited to in situ production of hydrogen; on the other hand, it is a major consumer of energy. The thermal cracking of ammonia and the catalytic reforming of methanol are advantageous in terms of energy; on the other hand, the cost of methanol and the safety and environmental problems related to the use of ammonia make these processes difficult to operate industrially. As regards the presence of burners which heat the endothermic region of a catalytic reactor, it results in plants which are not very compact and which are poorly suited to units which have to produce small amounts of hydrogen. It is certainly possible to use elements to provide this reheating but this proves to be costly in terms of electric current.

Another way of proceeding consists in producing a hydrogen/CO mixture by carrying out the partial oxidation of a hydrocarbon (methane or propane, for example) by $CO_2$ according to the reactions:

$$CH_4 + CO_2 \rightarrow 2CO + 2H_2 \quad (2)$$

$$\text{or } C_3H_8 + CO_2 \rightarrow 6CO + 2H_2 \quad (3)$$

An advantageous way of carrying out this reaction consists in using a cylindrical reactor, in the upper part of which is inserted a radiant oxygen burner, also cylindrical, with a diameter substantially smaller than that of the reactor, fed with hydrocarbon and with oxygen. This oxygen burner descends as far as into the lower part of the reactor, where it introduces the combustion gases $H_2O$ and $CO_2$. This lower part of the reactor is filled with an inert packing (for example, based on alumina), in which emerge the said combustion gases originating from the oxygen burner, on the one hand, and in which arrive, on the other hand, the gases (hydrocarbon and $CO_2$) necessary for reaction (2) or (3). It should be noted that the combustion reaction in the oxygen burner produces $CO_2$ and steam, which are used in the reaction for the production of the hydrogen/CO mixture. All these gases are mixed inside the inert region and rise inside the reactor by passing through an annular region defined by the internal wall of the reactor and the external wall of the oxygen burner. It is in this annular region that reaction (2) or (3) takes place, as it is filled with a catalyst, which it is possible to maintain at a temperature of approximately 1 200° C. as the result of its contact with the wall of the oxygen burner, despite the highly endothermic natures of reactions (2) and (3). The steam provided by the oxygen burner is sufficient by itself alone to prevent the formation of soot and the blocking of the reactor; no external steam supply is necessary for this purpose. The hydrogen/CO mixture produced is discharged from the upper part of the reactor and can be used on site or stored for use ex situ. The CO content of the mixture produced by the generator can advantageously be adjusted by introducing more or less $CO_2$ into the lower part of the reactor in addition to the $CO_2$ produced by the oxygen burner. A small reactor is thus obtained.

In the partial oxidation reaction of methane (or of another light hydrocarbon, such as propane or butane) in order to obtain a hydrogen/CO mixture, a purely thermal cracking requires temperatures of the order of 1 700° C. to achieve very high degrees of conversion (greater than 99%) with sufficiently reduced reaction times, of the order of 0.1 s. As the mixture is outside the flammability limits and the adiabatic temperature is approximately 650° C., it is necessary to burn a portion of the fuel in order to achieve these temperature levels.

Nevertheless, a thermodynamic analysis shows that, if the heat recovery is correctly organized, it is possible to operate under autothermal conditions.

This principle was proposed in document U.S. Pat. No. 5,441,581 (reference may also be made, in this category, to document WO93/21350): the heat exchanger, which is of the gas-gas type, is incorporated in the process for the manufacture of a CO/hydrogen/nitrogen mixture from a hydrocarbon/air mixture. The heat exchanger makes it possible to preheat the hydrocarbon/air mixture. Nevertheless, in this plant, heat exchange only takes place by convection. To be effective, it requires large exchange surface areas and high flow rates, resulting in the production of relatively complex exchangers. It is also important to note that, as the cooling is carried out slowly, the CO decomposes to $CO_2$ and carbon according to the Boudouard equilibrium, which results in the formation of soot.

SUMMARY OF THE INVENTION

One of the objectives of the present invention is to provide a process for the production of a mixture comprising hydrogen and CO by partial oxidation of a hydrocarbon which exhibits the following characteristics:

- an excellent energy balance, making it possible to operate under autothermal conditions;
- the use of a small production plant which requires only a limited investment;
- excellent reliability and great simplicity;
- the possibility of treating all types of initial feedstock; and
- suitability for medium scale production, of the order of 100 to 1 000 m³/h.

To this end, a subject matter of the invention is a process for the production of a mixture comprising hydrogen and CO, of the type according to which partial oxidation of a hydrocarbon by an oxygenated medium or a medium capable of releasing oxygen is carried out, and according to which the processing is carried out under autothermal conditions, the heat given off by said oxidation being recovered to maintain the endothermic reactions which take place between the nonoxidized fraction of said hydrocarbon and the $CO_2$ and the steam produced by said oxidation, being characterized in that:

the reaction gas mixture comprising the hydrocarbon and the oxygenated medium is passed through a porous medium which has been preheated beforehand, thus making it possible to heat the reaction gas mixture by heat exchange with the porous medium to a temperature threshold sufficient to initiate combustion reactions, rendering unnecessary an external heat supply when operating continuously.

As will be clearly apparent to a person skilled in the art, the process according to the invention is based on combustion in a porous medium, during which the combustion gases return their heat to the porous medium to emerge from the reactor at a temperature close to the adiabatic temperature.

The filtration conditions, in particular the size of the beads generally constituting the porous medium and the flow rate of the gas, make it possible to adjust the temperature threshold. Thus, the combustion temperature is no longer solely a function of the calorific value of the fuel (adiabatic temperature) but is a function of the filtration conditions (flow rate, calorific value of the materials, size of the porous beads and porosity of the medium, and the like). The result of this is that the combustion temperature can be greater than the adiabatic temperature.

Combustion in a porous medium has three main advantages.

First of all, it is possible to use fuel/oxidant mixtures outside the flammability limits. Thus, it is possible to burn mixtures with a very low charge of oxidant (the main application being the destruction of organic pollutants in air) or to burn very rich fuels and thus to use a low content of fuel.

Furthermore, the use of the energy is optimum (no losses). The temperature profile of the reactor exhibits a hot region, where combustion takes place, at an outlet temperature of the gases which is close to the adiabatic temperature. The reactor can operate under autothermal conditions, the only heat losses originate from heat exchanges with the wall of the reactor.

In fact, the combustion and the recovery of the heat are carried out in the same reactor. This leads to plants which are more compact than those employing a conventional combustion process and thus to a minimization of the heat losses.

The process according to the invention can furthermore adopt one or more of the following technical characteristics:

said preheated porous medium is formed by a first inert porous material and the reaction gas mixture successively encounters said first inert porous material, a catalytic bed and then a second inert porous material.

said first and second inert porous material are identical.

said reaction gas mixture successively encounters said first inert porous material, said catalytic bed and said second inert porous material within a vertical cylindrical reactor, the ends of which are filled with one or other of said inert porous materials and the central part of which is filled with said catalytic bed, the reactor being fed in alternate mode in the following way:

i) the reaction gas mixture is introduced in the lower part of the reactor and the mixture comprising the hydrogen and the CO is collected at the upper part of the reactor, or ii) the reaction gas mixture is introduced in the upper part of the reactor (1) and the mixture comprising the hydrogen and the CO is collected at the lower part of the reactor, passing from one of the introduction modes to the other ((i) (ii)) as a function of the advance of the combustion front inside the reactor.

said reaction gas mixture successively encounters said first inert porous material, said catalytic bed and said second inert porous material within a reactor exhibiting the following arrangement:

a) a first cylinder comprising, at its lower end, means for introducing said reaction gas mixture;

b) a second cylinder of smaller diameter than said first cylinder, inserted into said first cylinder so that its upper end is situated at a distance from the upper end of the first cylinder and so that its lower end, via which the mixture comprising the hydrogen and the CO is collected, emerges outside the first cylinder;

c) said first inert porous material filling at least a portion of the height of the annular space defined by the internal wall of the first cylinder and the external wall of the second cylinder, said catalytic bed filling the upper part of the first cylinder and/or that of the second cylinder, and said second inert porous material filling the lower part of the second cylinder.

the preheating of said porous medium is carried out using electrical elements situated at the periphery of the reactor.

the preheating of said porous medium is carried out by circulating therein, prior to said introduction of the reaction mixture, a preheating gas mixture comprising a hydrocarbon and oxygen which makes possible total combustion (for example in a ratio of 1 mol of methane per 2 mol of oxygen).

BRIEF DESCRIPTION OF THE FIGURES OF THE DRAWINGS

Examples of the implementation of the process according to the invention and of devices which make possible this implementation will now be described, with reference to the following appended figures.

DETAILED DESCRIPTION OF THE PREFERRED EMBODIMENTS

Figure 1:
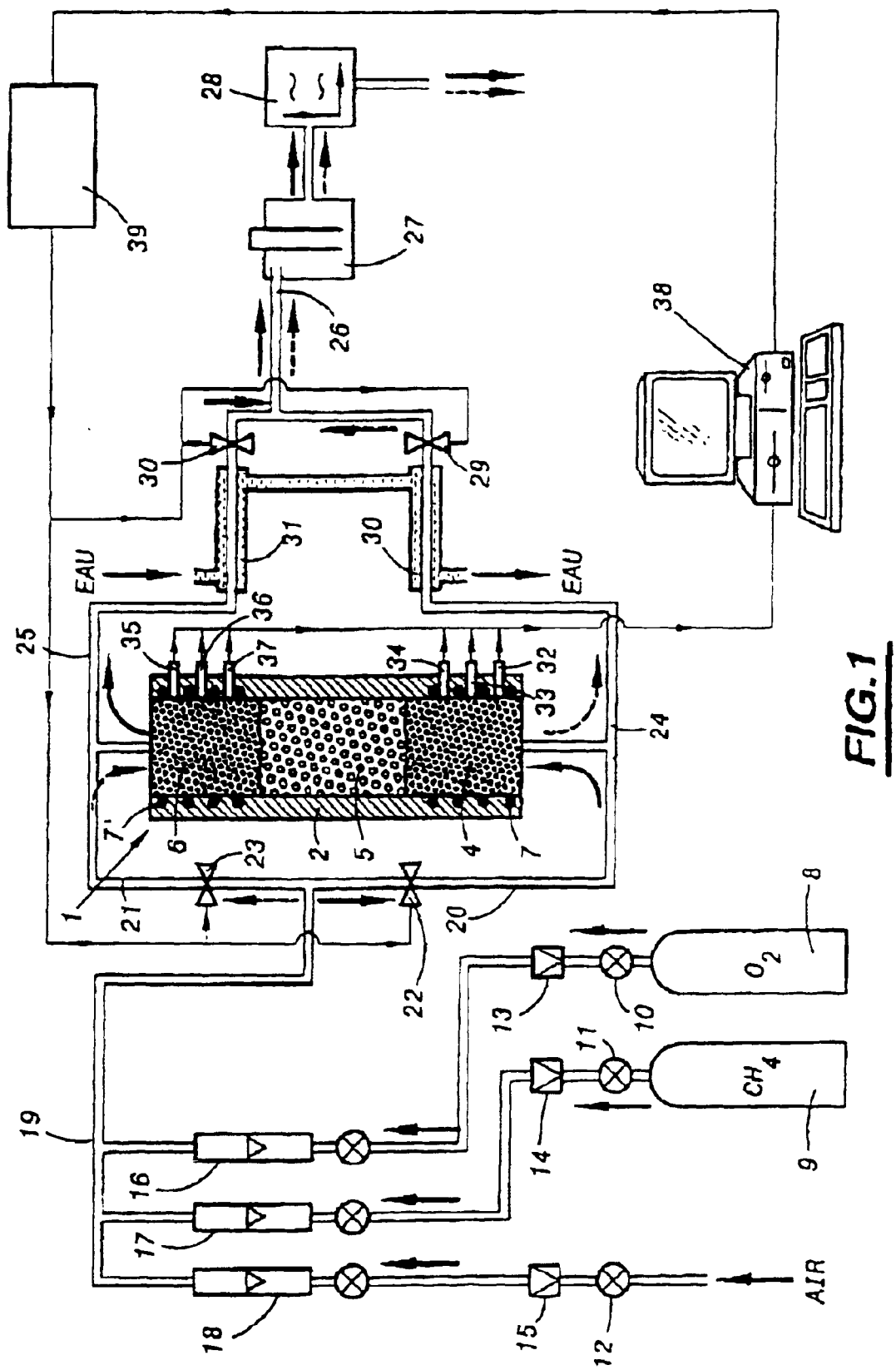
FIG. 1, which shows a view in longitudinal cross section of a first example of a plant for the implementation of the process according to the invention.

The main component of the plant according to the invention represented in FIG. 1 is a vertical cylindrical reactor 1 comprising a wall 2 and an internal space filled with a packing divided into several regions. In accordance with its vertical axis, the reactor 1 is divided into three directly superimposed regions each exhibiting a packing of predetermined nature. With respect to the embodiment represented, the lower part of the reactor 1 comprises a first packing 4 composed of an inert porous material (i.e. devoid of catalyst), such as alumina beads (in this instance with a mean diameter in the vicinity of 5 mm). The central part of the reactor 1 is itself packed with a catalytic bed 5 represented, for example, by a catalyst based on platinum deposited on an alumina support. The upper part of the reactor 1 comprises a second packing of inert porous material 6 identical to the porous material used for the lower part 4 of the reactor 1. The respective heights of these three packing regions 4, 5, 6 can vary according to the wishes of the operator but generally the packings 4 of the lower region 6 and of the upper region of the reactor 1 are identical in height. In an implementational example which will be described later, each of the regions 4, 5, 6 represents substantially ⅓ of the working height of the reactor (that is to say, of the total height of the three packing regions 4, 5, 6).

At its lower and upper ends, the reactor 1 of the embodiment illustrated here comprises selective heating systems 7 and 7', for example electrical elements, the role of which in the preheating of regions 4 and 6 will be given in detail later.

The reactor 1 is fed with gas via a plant comprising:

a) an oxygen tank 8 (it will have been understood that this tank can also comprise any other oxygenated medium or medium capable of releasing oxygen, such as air, enriched air, $CO_2$, and the like);

b) a tank 9 comprising a light hydrocarbon, such as methane, or a mixture of such light hydrocarbons.

An array of valves 10, 11, 12, of pumps 13, 14, 15 and of rotameters 16, 17, 18 makes it possible to regulate the throughputs and the proportions of these various gases, which are introduced into a common pipe 19 to form a $CH_4/O_2$ gas mixture in proportions which vary according to requirements. This pipe 19 is subsequently subdivided into two branches 20, 21 which make it possible to introduce the gas mixture at the lower end of the reactor 1 or at the upper end of the reactor 1 respectively. The admission of the gases into one or other of these branches 20, 21 is controlled by two on-off valves 22, 23 situated respectively on the pipe 20 leading to the lower end of the reactor 10 and on the pipe 21 leading to the upper end of the reactor 1.

To make it possible to analyze the gases entering or departing from the reactor 1, pipes 24, 25 are attached to the pipes 20, 21 respectively and meet up to form a common pipe 26 leading to a plant for drying the gases 27 and then to a device for the analysis 28 of these same gases, for example by chromatography. On-off valves 29, 30 are placed on the pipes 24, 25 so as to convey, into the pipe 26 and into the drying device 27 and analytical device 28 which follow it, only gases resulting either from the pipe 24 or from the pipe 25. On their departure from the analytical device 28, the gases are sent to their place of use or of storage, after having optionally been subjected to an operation for the separation of their various components.

Cooling devices 30, 31 are placed on the pipes 24, 25 so as to provide the gases passing through these pipes 24, 25 with a temperature suitable for their drying and for their analysis.

The reactor 1 is equipped with a battery of thermocouples 32, 33, 34 (or with other means for measuring the temperature) which pass through its wall 2 and make it possible to measure the temperature prevailing at various levels in the porous medium 4 situated at the lower end of the reactor 1. Similar thermocouples 35, 36 or 37 also pass through the wall 2 of the reactor 1 in its upper part, so as to measure the temperature prevailing at various levels in the porous medium 6 situated in the upper part of the reactor 1.

The plant also comprises data processing means 38 which receive the information supplied by the thermocouples 32, 33, 34, 35, 36, 37. These data processing means 38 are themselves connected to control means 39 which actuate the various on-off valves 22, 23, 29, 30 controlling the admission of the gases entering and leaving the reactor 1 into the various pipes of the gas circuit.

In one embodiment, the reactor 1 has a working height of approximately 400 mm for a diameter of 30 mm. In another embodiment, the reactor 1 has a working height of 75 mm and a diameter of 70 mm. An increase in the diameter of the reactor 1 is favorable to an increase in the productivity of the plant.

Two embodiments of the reactor 1 will now be described.

The first embodiment of the reactor of FIG. 1 is not representative of the invention and is given only by way of comparative reference. The reactor 1 is filled solely with alumina beads with a mean diameter in the region of 2 mm and the gas is given a flow rate of approximately 0.5 m/s. When operating continuously, the respective proportions and the throughputs of the various gases injected or obtained are as follows:

a total reaction mixture entering throughput of 2.3 m³/h ($CH_4$-½$O_2$), a content of hydrogen in the exiting mixture of 16.7% (when the theoretical maximum is 40%).

Preliminary calculations show that these conditions should theoretically make it possible to achieve temperatures of the order of 1 550° C. However, the results show that, whatever the operating conditions, the maximum temperature threshold achieved inside the reactor is of the order of 1 450° C. A degree of conversion of the methane of only 80% is then obtained. Furthermore, analysis of the outlet gases shows a significant divergence with respect to the theoretical concentrations calculated.

This limiting phenomenon can explained by the appearance of a heterogeneous catalysis process between the methane and the material of the porous medium (alumina). The combustion of the mixture then begins at a temperature which is too low to have a greater enhancing effect making it possible to achieve a critical threshold of 1 500° C. Furthermore, it is found that the temperature profile along the reactor has two regions. In the first region, exothermic reactions take place $$CH_4 + \tfrac{1}{2}O_2 \rightarrow CO + 2H_2 \tag{1}$$

and $$CH_4 + 2O_2 \rightarrow CO_2 + H_2O \tag{2}$$

These reactions are followed by endothermic reactions:

$$CH_4 + H_2O \rightarrow CO + 3H_2 \tag{3}$$

$$CH_4 + CO_2 \rightarrow 2CO + 2H_2 \tag{4}$$

which result in a rapid decrease in the temperature in the second region of the reactor. The high activation energy of reactions (3) and (4) results in a high dependence on the temperature of the overall operation of the reactor. Below 1 200° C., hydrogen production is virtually zero. Such an operating mode of the reactor 1 is thus clearly unsatisfactory.

In the following example of employing the reactor 1, which is an example of employing the process according to the invention, the reactor 1 is used as represented in FIG. 1. It is divided internally into three superimposed regions: a lower region 4 filled with an inert packing material, namely alumina beads with a mean diameter of 5 mm, a central region 5 filled with a catalytic bed of platinum deposited on alumina, and an upper region 6 filled with a packing material identical to the packing material 4 filling the lower part of the reactor 1. Each of the materials of the regions 4, 5, 6 is arranged over a thickness representing approximately ⅓ of the working height of the reactor 1. All the materials of the regions 4, 5, 6 can be held between two layers of alumina foam which act as support for all the materials and which make it possible to homogenize the distribution of the injected gases over the whole of the cross section of the reactor.

In a first step, the on-off valves 23, 29 are closed and the on-off valves 22, 30 are open. In this way, the various gases composing the reaction medium are introduced via the lower part of the reactor 1 through the pipe 20 and the gases produced in the reactor 1 exit therefrom via its upper part to enter the pipe 25 (according to the continuous-line arrows in FIG. 1).

However, prior to beginning this introduction of the gases into the reactor 1, the lower part of the first packing 4 was preheated by means of electrical elements 7, so as to provide an initial temperature of the medium sufficient to initiate the reaction for the combustion of the methane.

Nevertheless, it should be noted that this electrical preheating mode is not very advantageous as it results in lengthy start-up phases due to the thermal inertia of the porous medium.

In an alternative form (much faster than a conventional thermal preheating), this preheating phase can be provided by the introduction for a few minutes, at the initial stage of the operation, of a gas mixture which is highly enriched in oxygen, for example in proportions $CH_4/2O_2$ (stoichiometric total combustion).

Subsequently, for a few moments, a gas mixture which is highly depleted in methane (of the type $CH_4+20O_2$, for example) can advantageously be blown in with the aim of cooling the first packing 4. The aim is thus to avoid an excessively early initiation of the combustion reaction in the inert porous packing 4 and to homogenize the temperature throughout the reactor 1.

After such a "superstoichiometric" preheating phase, the reaction mixture can subsequently be injected in satisfactory stoichiometric portions ($CH_4$-½$O_2$)

The reaction for the combustion of the methane then results in a high release of energy, which can take place either in the first inert porous packing 4 or in the catalytic medium 5. If the release of energy takes place in the catalytic medium 5, or between the inert medium and the medium 4 and the catalytic medium 5, it is then necessary to adjust the conditions for passing the injected gases into the plant in order to limit the temperature prevailing in the catalytic region 5 so as not to damage the catalyst. On the other hand, if the release of energy takes place essentially in the first inert porous packing 4, it is not necessary to take measures to limit the temperature in the catalytic medium 5, and temperatures of the order of 1 100° C. can be introduced in the first inert porous packing 4. Under these conditions, a smaller volume of catalyst can be used. The thermocouples 32, 33, 34 make it possible to monitor the advance of the combustion front and thus to detect at what moment the latter approaches the catalytic bed 5. Typically, the combustion front advances at a rate of the order of 6 cm/min. Carrying out exothermic reaction (1) in the first inert porous packing 4 in this instance introduces a temperature of the catalytic bed 5 of between approximately 600 and 900° C. under normal conditions, which makes it possible to maintain endothermic reactions (3) and (4) therein. The entire reactor then operates under autothermal conditions, according to the principles of combustion in a porous medium which were described previously.

When the data supplied by the thermocouples 32, 33, 34 to the data processing means 38 show that the combustion front has advanced in the direction of the upper part of the reactor 1, the data processing means 38 require the control means 39 to close the valves 22, 30 and to open the valves 23, 29. In this way, the reaction gases enter the pipe 21 and are now injected in the upper part of the reactor 1, so as to take advantage of the enthalpy of the second inert porous packing 6 situated at the upper part of the reactor 1 over which the preceding combustion front has just arrived. The gases produced in the reactor 1 exit therefrom via its lower part and enter the pipe 24 (according to the dotted arrows in FIG. 1). In the same way as above, this second inert packing 6 has been preheated beforehand by the electrical elements 7' or else is heated at the beginning of the reaction process by an enrichment of the gas mixture with oxygen. Likewise, the thermocouples 35, 36, 37 monitor the advance of the combustion front, thus making it possible to detect at what moment the latter approaches the catalytic bed 5, and the like.

The reactor 1 can thus be operated in "alternate flow" in the way which has just been described, guaranteeing an operating mode which makes it possible to avoid a rapid deterioration in the properties of the catalytic bed 5.

Under the experimental conditions which have been described and for a total entering throughput in the region of 1 m³/h with a $CH_4/O_2$ ratio equal to 2.1 (for an entering pressure in the region of 1 bar), an outlet mixture is obtained for which the $CH_4/H_2$ ratio (yield) is in the region of 1.7 (the maximum theoretical yield being 2), the gas exiting from the plant comprising approximately 40% of hydrogen, 2% of $CH_4$ and 17% of CO.

Figure 2:
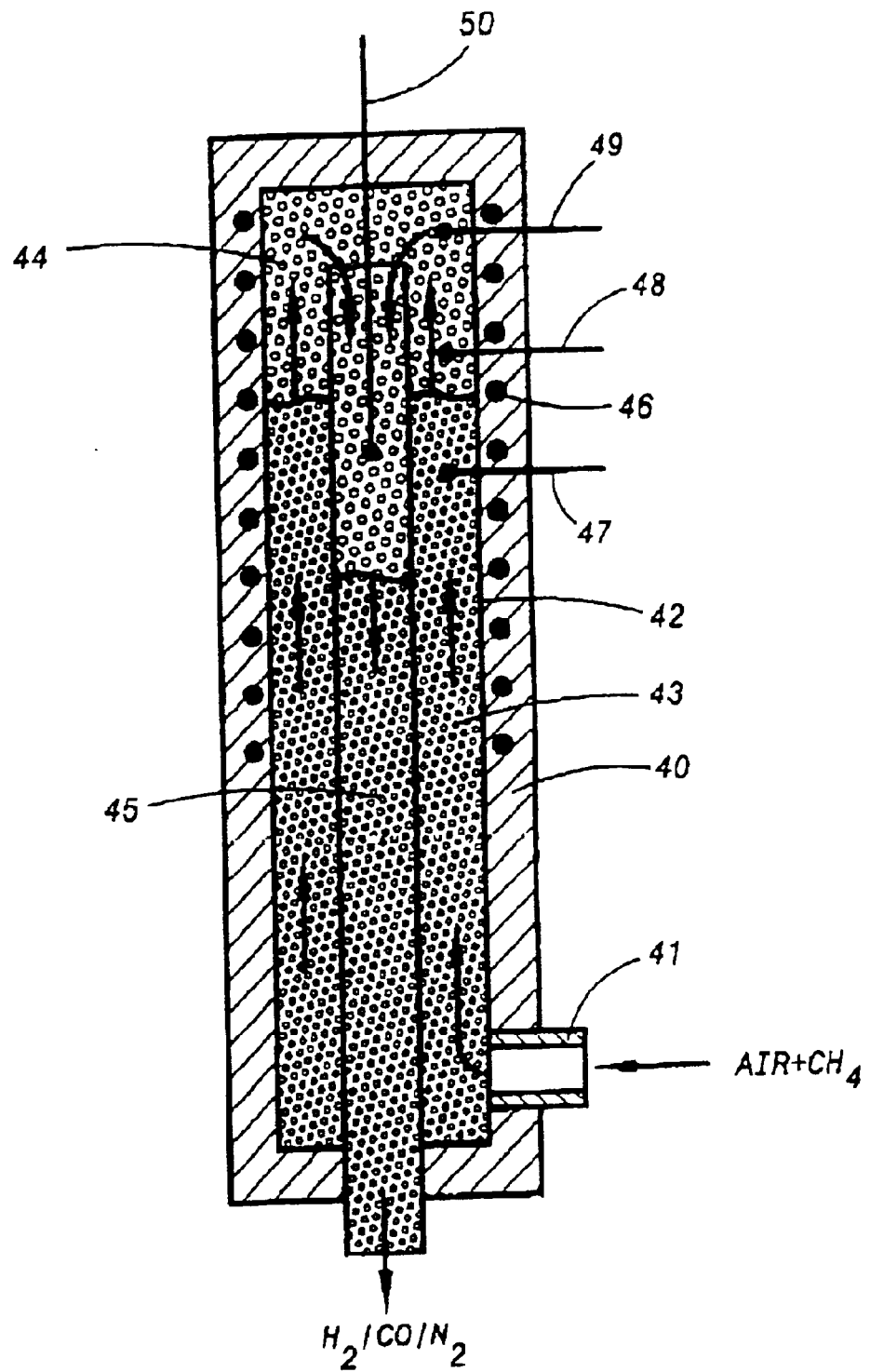
FIG. 2, which shows a second example of a plant for the implementation of the process according to the invention.

Another device according to the invention, represented in FIG. 2, comprises two overlapping cylinders. The first cylinder 40 comprises, at its lower part, a pipe 41 via which the mixture of hydrocarbon and of oxygenated medium intended to produce the desired $H_2/CO/N_2$ or $H_2CO$ mixture can be introduced. The second cylinder 42, with a smaller diameter than the preceding cylinder, is inserted so that its external surface defines an annular space with the internal surface of the cylinder of large diameter 40. The upper end of the second cylinder of small diameter 42 is situated at a distance from the upper end of the first cylinder of large diameter 40 and the lower end of the second cylinder of small diameter 42 emerges outside the first cylinder of large diameter 40. After their entry into the cylinder 40, the gases of the reaction mixture pass through a packing 43 forming an inert porous medium comparable to the inert porous packings 4, 6 of the plant of FIG. 1. This packing 43 can be, for example, composed of alumina beads with a mean diameter of approximately 5 mm. In the upper part of the first cylinder 40, this inert packing 43 is replaced by a catalytic bed 44 represented, for example, by a catalyst based on platinum deposited on an alumina support. This catalytic bed also fills the upper part of the second cylinder 42. The remainder of the cylinder of small diameter 42, as far as its lower end, is filled with a packing 45 of inert porous material generally similar to the packing 43 present in the lower part of the first cylinder 40. Preheating means, such as an electrical element 46, are here an integral part of the wall of the cylinder of large diameter 40 in its upper part. A battery of thermocouples 47, 48, 49, 50 makes it possible to monitor the temperatures prevailing in the various regions of the reactor. It is thus possible to determine the temperatures prevailing in the upper part of the inert porous medium 43 present in the first cylinder 40 and at the various levels of the catalytic bed 44, both for its part present in the first cylinder 40 and for its part present in the second cylinder 42.

In the same way as in the reactor of FIG. 1, the combustion reaction between the methane and the oxygen begins inside the inert porous medium 43. The heat given off by this reaction is passed on to the catalytic bed 44 so as to compensate therein for the endothermic effect of reforming reactions 3, 4 which take place therein. Here again, it is possible to determine the various operating parameters of the reactor for the latter to operate under autothermal conditions, thus without any external heat supply being necessary, apart from possibly during the initiation phase of the combustion operation via the element 46 or via by a preheating phase which is superstoichiometric with respect to oxygen.

By way of indication, the reactor can have the following dimensions: internal length of the first cylinder of large diameter 40: 600 mm; internal diameter of this same cylinder 40: 65 mm; total length of the catalytic bed: 480 mm.

Under the experimental conditions which have been described and for a total entering throughput of 1.5 m$^3$/h with a $CH_4/O_2$ ratio equal to 1.9 (for an entering pressure in the region of 1.8 bar), an outlet mixture is obtained for which the $CH_4/H_2$ ratio (yield) is in the region of 1.6 (the maximum theoretical yield being 2), the gas exiting from the plant comprising approximately 37.1% of hydrogen, 4.2% of $CH_4$ and 14.6% of CO.

As an alternative form, it can be envisaged for the inert porous packing 43 to fill the cylinder 40 of large diameter as far as its upper end. The catalytic bed 44 is then present only in the upper part of the cylinder of small diameter 42.

With such a reactor of the "countercurrentwise flow" type, an efficiency is obtained which is somewhat lower from the viewpoint of the heat recovery than with the preceding reactor, referred to as an "alternate flow" reactor. To achieve the same efficiency, an alternate flow reactor must comprise greater exchange surface areas than in the case of a countercurrentwise flow reactor. On the other hand, the countercurrentwise flow reactor operates in a stationary manner and does not require any control means targeted at regularly reversing the directions of the gas flows.

In both the reactor cases which have just been set out, it is apparent, with experience, that the cooling of the gases resulting from the reaction is sufficiently rapid to prevent decomposition of the CO, which would form soot. Such a formation of soot only occurs when the $CH_4/O_2$ ratio is increased substantially beyond the stoichiometric ratio.

Operation under pressure is also possible. It should be noted that the reaction gases enter the reactor at ambient temperature, which eliminates any risk of flammability, in particular when the pressure is increased. Tests carried out at 10 bar, with operating conditions similar to those described in the example, on the reactor of "alternate flow" type have made it possible to generate $H_2$/CO mixture comprising 35% of hydrogen.

These types of reactors are relatively simple in design and are reduced in size, and do not require an external energy supply, except for the transitory initiation period. This preheating can, as has been seen above, advantageously be carried out by total combustion of the hydrocarbon, which makes it possible to dispense with the addition of electrical elements while decreasing the start-up time. They thus exhibit an altogether lower operating and capital cost. This renders them highly advantageous with respect to the endothermic catalytic oxidation processes previously used for the production of $H_2$/CO mixtures.

What is claimed is:

1. Process for the production of a mixture comprising hydrogen and CO, comprising partially oxidizing a hydrocarbon by an oxygenated medium or a medium capable of releasing oxygen, wherein the process is carried out under autothermal conditions, the heat given off by said oxidation being recovered to maintain the endothermic reactions which take place between a nonoxidized fraction of said hydrocarbon and $CO_2$ and steam produced by said oxidation, wherein a reaction gas mixture comprising the hydrocarbon and the oxygenated medium or medium capable of releasing oxygen, is introduced into a porous medium which has been preheated beforehand, and wherein the introduction of the reaction gas mixture into the porous medium results in heating the reaction gas mixture by heat exchange with the porous medium to a temperature sufficient to initiate a combustion reaction, wherein said preheated porous medium is formed by a first inert porous material and wherein the reaction gas mixture or a product thereof successively encounters said first inert porous material, a catalytic bed and then a second inert porous material within a vertical cylindrical reactor, the ends of which are filled with one or other of said inert porous materials and the central part of which is filled with said catalytic bed, and alternately feeding the reactor with the reaction gas mixture by the following introduction modes (i) and (ii):
(i) the reaction gas mixture is introduced to a lower part of the reactor and the mixture comprising, the hydrogen and the CO is collected at an upper part of the reactor, or
(ii) the reaction gas mixture is introduced to the upper part of the reactor and the mixture comprising the hydrogen and the CO is collected at the lower part of the reactor,
wherein the introduction modes (i) and (ii) alternate as a function of the advance of a combustion front inside the reactor.

2. Process according to claim 1, wherein said first and second inert porous materials are identical.

3. Process according to claim 1, wherein the preheating of said porous medium is carried out using electrical elements situated at the periphery of the reactor.

4. Process according to claim 1, wherein the preheating of said porous medium is carried out by circulating therein, prior to said introduction of the reaction mixture, a preheating gas mixture comprising a hydrocarbon and oxygen in proportions for achieving total combustion.

5. Process according to claim 1, wherein said reaction gas mixture or a product thereof successively encounters said first inert porous material, said catalytic bed and said second inert porous material within a reactor comprising the following arrangement:

a first cylinder comprising, at its lower end, means for introducing said reaction gas mixture;

a second cylinder of smaller diameter than said first cylinder, inserted into said first cylinder so that its upper end is situated at a distance from the upper end of the first cylinder and so that its lower end, via which the mixture comprising the hydrogen and the CO is collected, emerges outside the first cylinder;

said first inert porous material filling at least a portion of the height of the annular space defined by the internal wall of the first cylinder and the external wall of the second cylinder;

said catalytic bed filling the upper part of the first cylinder and/or that of the second cylinder;

said second inert porous material filling the lower part of the second cylinder.

6. Process according to claim 5, wherein the preheating of said porous medium is carried out using electrical elements situated at the periphery of the reactor.

7. Process according to claim 5, wherein the preheating of said porous medium is carried out by circulating therein, prior to said introduction of the reaction mixture, a preheating gas mixture comprising a hydrocarbon and oxygen in proportions for achieving total combustion.

8. Process according to claim 1, wherein the preheating of said porous medium is carried out using electrical elements situated at the periphery of the reactor.

9. Process according to claim 2, wherein the preheating of said porous medium is carried out using electrical elements situated at the periphery of the reactor.

10. Process according to claim 1, wherein the preheating of said porous medium is carried out by circulating therein, prior to said introduction of the reaction mixture, a preheating gas mixture comprising a hydrocarbon and oxygen in proportions for achieving total combustion.

11. Process according to claim 2, wherein the preheating of said porous medium is carried out by circulating therein, prior to said introduction of the reaction mixture, a preheating gas mixture comprising a hydrocarbon and oxygen in proportions for achieving total combustion.

12. Process according to claim 2, wherein said reaction gas mixture or a product thereof successively encounters said first inert porous material, said catalytic bed and said second inert porous material within a reactor comprising the following arrangement:
- a first cylinder comprising, at its lower end, means for introducing said reaction gas mixture;
- a second cylinder of smaller diameter than said first cylinder, inserted into said first cylinder so that its upper end is situated at a distance from the upper end of the first cylinder and so that its lower end, via which the mixture comprising the hydrogen and the CO is collected, emerges outside the first cylinder;
- said first inert porous material filling at least a portion of the height of the annular space defined by the internal wall of the first cylinder and the external wall of the second cylinder;
- said catalytic bed filling the upper part of the first cylinder and/or that of the second cylinder;
- said second inert porous material filling the lower part of the second cylinder.

13. Process according to claim 12, wherein the preheating of said porous medium is carried out using electrical elements situated at the periphery of the reactor.

14. Process according to claim 12, wherein the preheating of said porous medium is carried out by circulating therein, prior to said introduction of the reaction mixture, a preheating gas mixture comprising a hydrocarbon and oxygen in proportions for achieving total combustion.

15. Process according to claim 1, wherein during continuous operation of the process, the porous medium is not heated by an external heat supply.

16. Process according to claim 1, wherein the entire flow of the reaction gas mixture is introduced into the porous medium.

17. Process for the production of a mixture comprising hydrogen and CO, comprising partially oxidizing a hydrocarbon by an oxygenated medium or a medium capable of releasing oxygen, wherein the process is carried out under autothermal conditions, the heat given off by said oxidation being recovered to maintain the endothermic reactions which take place between a nonoxidized fraction of said hydrocarbon and $CO_2$ and steam produced by said oxidation, wherein
- a flow of a reaction gas mixture comprising the hydrocarbon and the oxygenated medium or medium capable of releasing oxygen, is introduced into a reactor containing a porous medium which has been preheated beforehand, and wherein
- the introduction of the reaction gas mixture into the porous medium results in heating the reaction gas mixture by heat exchange with the porous medium to a temperature sufficient to initiate a combustion reaction, and wherein
- the entire flow of the reaction gas mixture is introduced into the porous medium, and wherein
- said preheated porous medium is formed by a first inert porous material and wherein the reaction gas mixture or a product thereof successively encounters said first inert porous material, a catalytic bed and then a second inert porous material within a vertical cylindrical reactor, the ends of which are filled with one or other of said inert porous materials and the central part of which is filled with said catalytic bed, the process further comprising alternately feeding the reactor containing the porous medium with the reaction gas mixture by the following introduction modes (i) and (ii):
- (i) the reaction gas mixture is introduced to a lower part of the reactor and the mixture comprising the hydrogen and the CO is collected at an upper part of the reactor, or
- (ii) the reaction gas mixture is introduced to the upper part of the reactor and the mixture comprising the hydrogen and the CO is collected at the lower art of the reactor,
- wherein the introduction modes (i) and (ii) alternate as a function of the advance of a combustion front inside the reactor.

* * * * *